(12) United States Patent
Xu

(10) Patent No.: US 11,929,635 B2
(45) Date of Patent: Mar. 12, 2024

(54) CHARGING METHOD AND CHARGING DEVICE

(71) Applicant: VIVO MOBILE COMMUNICATION CO., LTD., Guangdong (CN)

(72) Inventor: Chao Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 591 days.

(21) Appl. No.: 17/152,454

(22) Filed: Jan. 19, 2021

(65) Prior Publication Data

US 2021/0143661 A1 May 13, 2021

Related U.S. Application Data

(63) Continuation-in-part of application No. PCT/CN2019/097429, filed on Jul. 24, 2019.

(30) Foreign Application Priority Data

Jul. 27, 2018 (CN) .......................... 201810844948.3

(51) Int. Cl.
*H02J 7/00* (2006.01)
*H01M 10/44* (2006.01)

(52) U.S. Cl.
CPC ..... *H02J 7/007182* (2020.01); *H01M 10/443* (2013.01)

(58) Field of Classification Search
CPC ............. H02J 7/007182; H02J 7/00714; H02J 7/0086; H01M 10/443; H01M 10/44
See application file for complete search history.

(56) References Cited

U.S. PATENT DOCUMENTS

| 5,617,007 A | 4/1997 | Keidl et al. |
| 6,040,684 A | 3/2000 | Mitchell |

(Continued)

FOREIGN PATENT DOCUMENTS

| CN | 1269616 A | 10/2000 |
| CN | 1776991 A | 5/2006 |

(Continued)

OTHER PUBLICATIONS

International Search Report and Written Opinion of the International Searching Authority regarding International Application No. PCT/CN2019/097429, dated Oct. 28, 2019. Translation provided by Bohui Intellectual Property.

(Continued)

*Primary Examiner* — Nghia M Doan
(74) *Attorney, Agent, or Firm* — Harness, Dickey & Pierce, P.L.C.

(57) ABSTRACT

A charging method includes: charging a battery according to a second current value after charging the battery according to a first current value in each of N charging cycles, the second current value being less than the first current value, and N being a positive integer; and charging the battery according to a target cutoff voltage value in the case where a target voltage value is greater than or equal to the target cutoff voltage value at the end of the N charging cycle. The target voltage value is a charging voltage value corresponding to the first current value, and the target cutoff voltage value is a first cutoff voltage value, or the target voltage value is a charging voltage value corresponding to the second current value, the target cutoff voltage value is a second cutoff voltage value.

15 Claims, 6 Drawing Sheets

(56) References Cited

U.S. PATENT DOCUMENTS

| | | | | |
|---|---|---|---|---|
| 2003/0222623 | A1 | 12/2003 | Wae | |
| 2011/0199055 | A1* | 8/2011 | Burchardt | H01M 10/44 320/148 |
| 2020/0328608 | A1* | 10/2020 | Song | H01M 10/44 |

FOREIGN PATENT DOCUMENTS

| | | | | |
|---|---|---|---|---|
| CN | 202817813 | U | 3/2013 | |
| CN | 105978084 | A | 9/2016 | |
| CN | 105978088 | A | 9/2016 | |
| CN | 106712187 | A | 5/2017 | |
| CN | 107039696 | A | 8/2017 | |
| CN | 107093777 | A | 8/2017 | |
| CN | 108258346 | A | 7/2018 | |
| CN | 109065989 | A | 12/2018 | |
| JP | 3183808 | B2 | 7/2001 | |
| JP | 3740323 | B2 * | 2/2006 | H01M 10/052 |
| JP | 2018040676 | A | 3/2018 | |
| WO | WO-2018045920 | A1 | 3/2018 | |

OTHER PUBLICATIONS

First Office Action regarding Chinese Application No. 201810844948. 3, dated Sep. 27, 2019. Translation provided by Bohui Intellectual Property.

Notification to Grant Patent Right for Invention regarding Chinese Application No. 201810844948.3, dated May 8, 2020. Translation provided by Bohui Intellectual Property.

* cited by examiner

CHARGING METHOD AND CHARGING DEVICE

CROSS-REFERENCE TO RELATED APPLICATIONS

This application is a Bypass Continuation-in-part Application of PCT/CN2019/097429 filed on Jul. 24, 2019, which claims priority to Chinese Patent Application No. CN201810844948.3, filed on Jul. 27, 2018, titled "CHARGING METHOD AND CHARGING DEVICE", which are incorporated herein by reference in their entirety.

TECHNICAL FIELD

Embodiments of the present disclosure relate to the field of communication technologies, and more particularly, to a charging method and a charging device.

BACKGROUND

With the continuous progress in science and technology, the application of batteries becomes increasingly prevalent.

SUMMARY

In a first aspect, some embodiments of the present disclosure provide a charging method. The method includes: in each of N charging cycles, after charging a battery according to a first current value, charging the battery according to a second current value, the second current value being less than the first current value, and N being a positive integer; and at the end of the N charging cycle, charging the battery according to a target cutoff voltage value in the case where a target voltage value is greater than or equal to the target cutoff voltage value; wherein the target voltage value is a charging voltage value corresponding to the first current value, and the target cutoff voltage value is a first cutoff voltage value, or the target voltage value is a charging voltage value corresponding to the second current value, the target cutoff voltage value is a second cutoff voltage value, and the second cutoff voltage value is less than the first cutoff voltage value.

In a second aspect, some embodiments of the present disclosure provide a charging device. The charging device includes a charging module. The charging module is used to, in each of N charging cycles, charge a battery according to a second current value after charging the battery according to a first current value, the second current value being less than the first current value, and N being a positive integer; and, at the end of the N charging cycle, charge the battery according to a target cutoff voltage value in the case where a target voltage value is greater than or equal to the target cutoff voltage value; wherein the target voltage value is a charging voltage value corresponding to the first current value, and the target cutoff voltage value is a first cutoff voltage value, or the target voltage value is a charging voltage value corresponding to the second current value, the target cutoff voltage value is a second cutoff voltage value, and the second cutoff voltage value is less than the first cutoff voltage value.

In a third aspect, some embodiments of the present disclosure provide a charging device, and the charging device includes a processor, a memory, and a computer program that is stored in the memory and able to be executed on the processor. The computer program, when executed by the processor, performs steps of the charging method according to the first aspect.

In a fourth aspect, some embodiments of the present disclosure provide a non-transient computer-readable storage medium. The non-transient computer-readable storage medium stores a computer program that, when executed by a processor, performs the steps of the charging method according to the first aspect.

DETAILED DESCRIPTION

Figure 1:
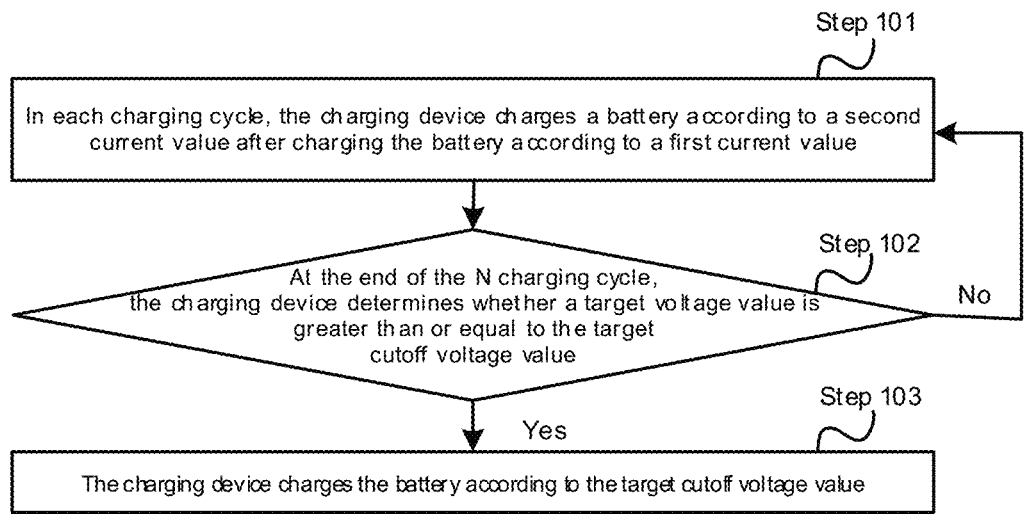
FIG. 1 is a first schematic diagram of a charging method, in accordance with some embodiments of the present disclosure.

The technical solutions in the embodiments of the present disclosure will be described clearly and completely with reference to accompanying drawings in the embodiments of the present disclosure. However, the described embodiments are merely some but not all embodiments of the present disclosure. All other embodiments obtained on the basis of the embodiments of the present disclosure by a person of ordinary skill in the art without paying any creative effort shall be included in the protection scope of the present disclosure.

The term "and/or" in the present disclosure is used to describe an association relationship of associated objects, which represents three kinds of relationships. For example, the phrase "A and/or B" represents three conditions: A existing alone, both A and B existing, and B existing alone.

The sign "/" in the present disclosure indicates that the associated objects are in an "or" relationship, for example A/B means A or B.

The terms "first" and "second," and the like in the description and the claims of the present disclosure are used for distinguishing between different objects and not for describing a particular order of the objects. For example, a first current value and a second current value, etc., are used for distinguishing different current values, and not for describing a specific order of the current values.

In the embodiments of the present disclosure, words such as "for example" or "such as" are used to indicate examples, illustrations or explanations. Any embodiment or design solution described as "for example" or "such as" in the embodiments of the present disclosure should not be construed as being more advantageous than other embodiments or design solutions. To be precise, the use of the words such as "for example" or "such as" is intended to present related concepts in a specific manner.

In the embodiments of the present disclosure, the term "a/the plurality of" means two or more unless otherwise specified. For example, a/the plurality of charging models refers to two or more charging models.

Some terms/nouns referred to in some embodiments of the present disclosure are explained below.

Polarization phenomenon refers to a phenomenon that a potential of an electrode departs from an equilibrium potential of the electrode when current passes through a battery. When the polarization phenomenon occurs in the battery, a corrosion rate of the battery will be increased. It will be noted that, polarizations in the embodiments of the present disclosure may include electrochemical polarization, Ohmic polarization, and concentration polarization.

Currently, the charging stages of charging the battery by the charging device may generally include a constant current charging stage, and a constant voltage charging stage following the constant current charging stage. In the constant current charging stage, the charging device may charge the battery with a constant current; and in the constant voltage charging stage, the charging device may charge the battery with a constant voltage.

However, since a polarization phenomenon may occur in the battery during the constant current charging stage, the charging device charges the battery for a long time with the constant current, which may lead to the continuous accumulation of the battery impedance. Thus, after the constant voltage charging stage is entered, it may take a long time to eliminate the accumulated battery impedance, resulting in long time charging of the battery.

In a charging method and a charging device provided by some embodiments of the present disclosure, in each of N (N is a positive integer) charging cycles, after a battery is charged according to a first current value, the battery may be charged according to a second current value, and the second current value is less than the first current value; and at the end of the N charging cycle, the battery is charged according to a target cutoff voltage value in the case where a target voltage value is greater than or equal to the target cutoff voltage value; wherein the target voltage value is a charging voltage value corresponding to the first current value, and the target cutoff voltage value is a first cutoff voltage value, or the target voltage value is a charging voltage value corresponding to the second current value, the target cutoff voltage value is a second cutoff voltage value, and the second cutoff voltage value is less than the first cutoff voltage value. Through this solution, since the battery may be charged adopting the first current value and the second current value in each of the N charging cycles, an adoption of the first current value to charge the battery may improve a charging speed of the battery, and an adoption of the second current value to charge the battery may eliminate battery impedance accumulated when the first current value is adopted to charge the battery to a certain extent, that is, the polarization phenomenon due to a fact that large current is adopted to charge the battery may be relieved, so that the battery impedance to be eliminated after a constant voltage charging stage is entered may be reduced. The charging method provided by some embodiments of the present disclosure may shorten a charging duration in the constant voltage charging stage, thereby shortening charging time of the battery and prolonging a service life of the battery.

It will be noted that, the charging device provided by some embodiments of the present disclosure may be used to charge the battery. It can be understood that, the charging device and the battery may be two independent devices. For example, the charging device may be a power adapter, the battery may be a battery disposed in a terminal device (e.g., a mobile phone), and the power adapter and the terminal device may be two independent devices. Or, the charging device and the battery may also be two independent functional modules in one device. For example, the one device may be a mobile phone, the charging device may be a battery control circuit or an integrated chip in the mobile phone, and the battery may be a battery disposed in the mobile phone. Or, the charging device may further include the battery. For example, the charging device may be a mobile power supply, and the battery may be a battery in the mobile power supply. Of course, the charging device and the battery may also be in other possible forms, which may be determined according to actual use demands, and not limited by the embodiments of the present disclosure.

The charging method and the charging device provided by some embodiments of the present disclosure will be described exemplarily below with reference to FIGS. 1 to 11.

An execution main body of the charging method provided by some embodiments of the present disclosure may be the above charging device, or may also be a functional module and/or a functional entity in the charging device that can implement the charging method, which, specifically, may be determined according to actual use demands, and not limited by the embodiments of the present disclosure. The charging method provided by some embodiments of the present disclosure will be described exemplarily below by taking the execution main body being the charging device as an example.

As shown in FIG. 1, some embodiments of the present disclosure provide a charging method. The charging method may include following steps 101 to 103.

In step 101, in each of N charging cycles, after a charging device charges a battery according to a first current value, the charging device charges the battery according to a second current value.

The second current value is less than the first current value. N is a positive integer.

In some embodiments of the present disclosure, a charging process of the battery by the charging device may include a constant current charging stage, and a constant voltage charging stage following the constant current charging stage. The constant current charging stage may include at least one charging cycle, i.e., N charging cycles, and N is a positive integer. It will be noted that, a difference from the related art in which a constant current value is adopted to charge the battery in the constant current charging stage is that, some embodiments of the present disclosure may adopt different current values to charge the battery in different periods of each charging cycle in the constant current charging stage.

Figure 12:
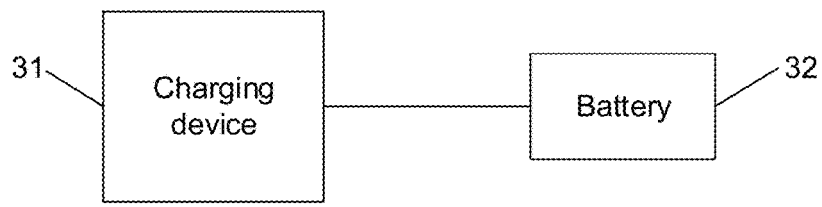
FIG. 12 is a schematic diagram of a connection between a charging device and a battery, in accordance with some embodiments of the present disclosure.

For example, as shown in FIG. 12, a charging device 31 is electrically connected to a battery 32, so that the charging device 31 may charge the battery 32, according to the manner of the step 101.

Optionally, in some embodiments of the present disclosure, for a case where the constant current charging stage includes at least two charging cycles, a relationship between a first current value in an (M+1)-th charging cycle and a first current value in an M-th charging cycle in the at least two charging cycles and a relationship between a second current value in the (M+1)-th charging cycle and a second current value in the M-th charging cycle in the at least two charging cycles may include the following four possible implementations. M is a positive integer.

For a first possible implementation, the first current value in the (M+1)-th charging cycle is equal to the first current value in the M-th charging cycle, and the second current value in the (M+1)-th charging cycle is equal to the second current value in the M-th charging cycle.

Figure 2:
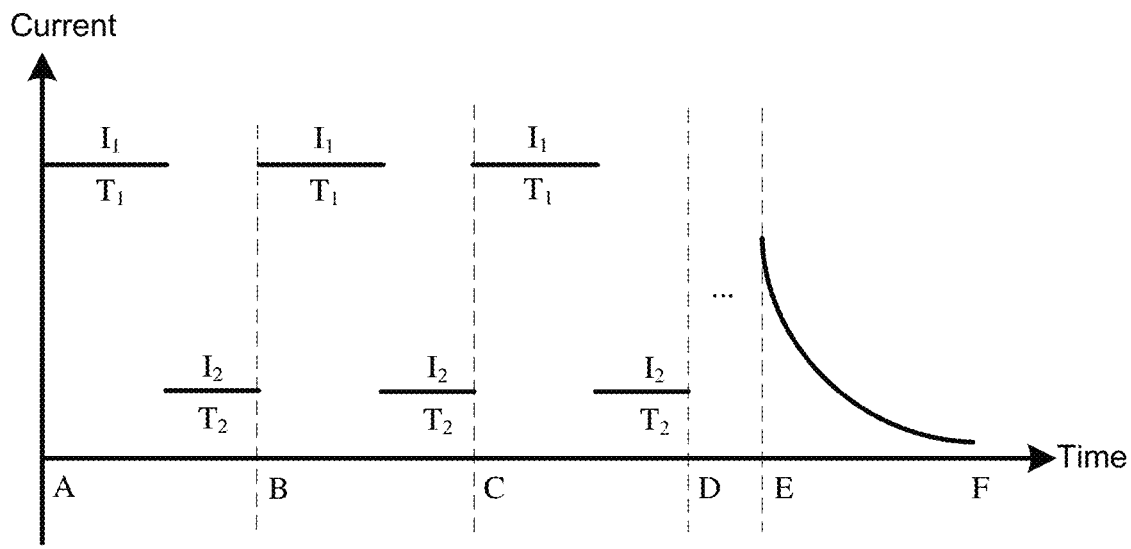
FIG. 2 is a first schematic diagram of a current-time curve in a charging process, in accordance with some embodiments of the present disclosure.

For example, FIG. 2 is a schematic diagram of a current-time curve in a charging process, in accordance with some embodiments of the present disclosure. The charging process may include a constant current charging stage AE and a constant voltage charging stage EF. The constant current charging stage AE may include N charging cycles, and the N charging cycles may include a first charging cycle AB, a second charging cycle BC, a third charging cycle CD, and other (N−3) charging cycles DE. As shown in FIG. 2, a first current value of each of the N charging cycles may be $I_1$, and a second current value of each charging cycle may be $I_2$, that is, the first current value in the (M+1)-th charging cycle is equal to the first current value in the M-th charging cycle, and the second current value in the (M+1)-th charging cycle is equal to the second current value in the M-th charging cycle. Since a charging voltage value corresponding to the first current value will increase with an increase of charging time, and a charging voltage value corresponding to the second current value will increase with the increase of the charging time, the charging process of the battery may enter the constant voltage charging stage EF in the case where the charging voltage value corresponding to the first current value is greater than or equal to a first cutoff voltage value, or in the case where the charging voltage value corresponding to the second current value is greater than or equal to a second cutoff voltage value.

It can be understood that, for the first possible implementation, the difference from the related art in which the battery is charged adopting a constant current value in the constant current charging stage is that, in the constant current charging stage of some embodiments of the present disclosure, the first current value and the second current value may be used to charge the battery in each of the N charging cycles. The first current value may be a large current, and the second current value may be a small current. As a result, charging by adopting the large current may improve the charging speed of the battery, and charging by adopting the small current may eliminate the battery impedance accumulated when the large current is used for charging to a certain extent in a period of charging the battery by adopting the small current, that is, the polarization phenomenon due to a fact that the battery is charged by the large current is relieved, so that it is possible to prevent the voltage value corresponding to the current value in the constant current charging stage from reaching a target cutoff voltage value too early, which otherwise will cause the constant voltage charging stage with relatively long charging time to be entered, thereby shortening the charging time of the battery, and prolonging the service life of the battery.

For a second possible implementation, the first current value in the (M+1)-th charging cycle is a difference between the first current value in the M-th charging cycle and a first preset value, and the second current value in the (M+1)-th charging cycle is equal to the second current value in the M-th charging cycle. The first preset value is a value greater than or equal to 0 and less than the first current value in the M-th charging cycle.

Figure 3:
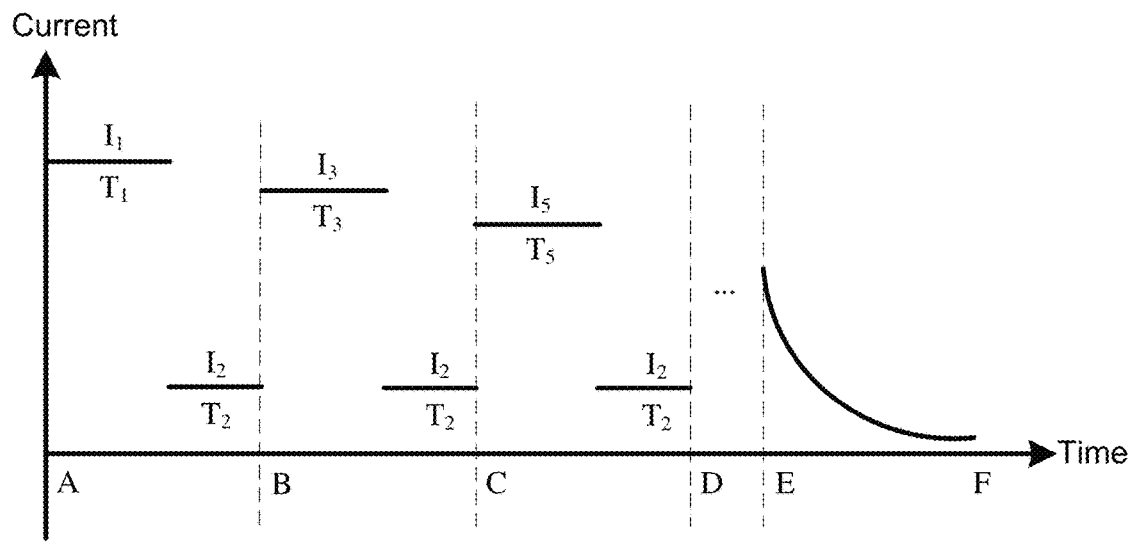
FIG. 3 is a second schematic diagram of a current-time curve in a charging process, in accordance with some embodiments of the present disclosure.

For example, FIG. 3 is a schematic diagram of a current-time curve in another charging process, in accordance with some embodiments of the present disclosure. The charging process may include a constant current charging stage AE and a constant voltage charging stage EF. The constant current charging stage AE may include N charging cycles, and the N charging cycles may include a first charging cycle AB, a second charging cycle BC, a third charging cycle CD, and other (N−3) charging cycles DE. Assuming that a first current value of each of the N charging cycles is $I_{2n-1}$, a second current value of each charging cycle is $I_2$, and a first preset value is $\Delta I_1$, then, as shown in FIG. 3, a first current value $I_3$ in the second charging cycle BC is a difference between a first current value $I_1$ in the first charging cycle AB and the first preset value $\Delta I_1$, a first current value $I_5$ in the third charging cycle CD is a difference between the first current value $I_3$ in the second charging cycle BC and the first preset value $\Delta I_1$, second current values of the charging cycles are equal, . . . , and so on. Since a charging voltage value corresponding to the first current value will increase with an increase of the charging time, and a charging voltage value corresponding to the second current value will increase with the increase of the charging time, the charging process of the battery may enter the constant voltage charging stage EF in the case where the charging voltage value corresponding to the first current value is greater than or equal to the first cutoff voltage value, or in the case where the charging voltage value corresponding to the second current value is greater than or equal to the second cutoff voltage value.

It can be understood that, a difference from the first possible implementation is that, in the second possible implementation, the first current value in the (M+1)-th charging cycle is the difference between the first current value in the M-th charging cycle and the first preset value. Since the smaller the charging current value is, the less obvious the polarization phenomenon occurring in the battery is, and the less the accumulated battery impedance is, by reducing the first current value in each charging cycle in sequence, it is possible to effectively relieve the polarization phenomenon due to a fact that the battery is charged by adopting the large current. As a result, it is possible to effectively prevent the voltage value corresponding to the current value in the constant current charging stage from reaching the target cutoff voltage value too early, which otherwise will cause the constant voltage charging stage with relatively long charging time to be entered, and to well prolong the service life of the battery.

For a third possible implementation, the first current value in the (M+1)-th charging cycle is equal to the first current value in the M-th charging cycle, and the second current value in the (M+1)-th charging cycle is a sum of the second current value in the M-th charging cycle and a second preset value. The second preset value is a value greater than or equal to 0 and less than the second current value in the M-th charging cycle.

Figure 4:
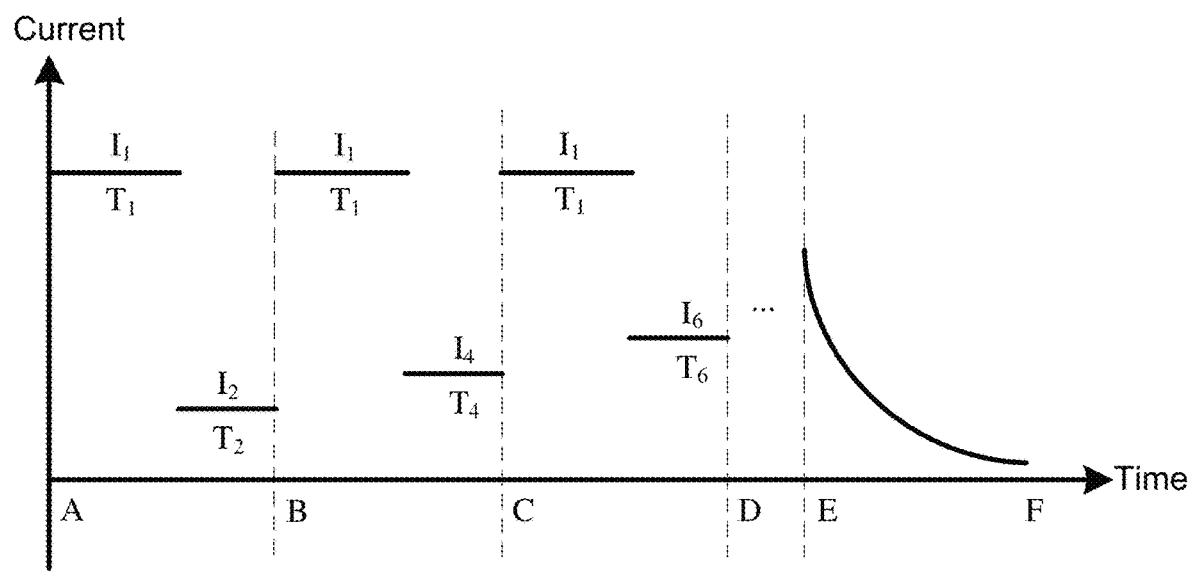
FIG. 4 is a third schematic diagram of a current-time curve in a charging process, in accordance with some embodiments of the present disclosure.

For example, FIG. 4 is a schematic diagram of a current-time curve in another charging process, in accordance with some embodiments of the present disclosure. The charging process may include a constant current charging stage AE and a constant voltage charging stage EF. The constant current charging stage AE may include N charging cycles, and the N charging cycles may include a first charging cycle AB, a second charging cycle BC, a third charging cycle CD, and other (N−3) charging cycles DE. Assuming that a first current value of each of the N charging cycles is $I_1$, a second current value of each charging cycle is $I_{2n}$, and a second preset value is $\Delta I_2$, then, as shown in FIG. 4, a second current value $I_4$ in the second charging cycle BC is a sum of a second current value $I_2$ in the first charging cycle AB and the second preset value $\Delta I_2$, a second current value $I_6$ in the third charging cycle CD is a sum of the second current value $I_4$ in the second charging cycle BC and the second preset value $\Delta I_2$, first current values of the charging cycles are equal . . . , and so on. Since a charging voltage value corresponding to the first current value will increase with an increase of the charging time, and a charging voltage value corresponding to the second current value will increase with the increase of the charging time, the charging process of the battery may enter the constant voltage charging stage EF in the case where the charging voltage value corresponding to the first current value is greater than or equal to the first cutoff voltage value, or in the case where the charging voltage value corresponding to the second current value is greater than or equal to the second cutoff voltage value.

It can be understood that, a difference from the first possible implementation is that, in the third possible implementation, the second current value in the (M+1)-th charging cycle is the sum of the second current value in the M-th charging cycle and the second preset value. On the one hand, the second current value is used for charging, and the second current value may be a small current, so that in the period of charging the battery adopting the small current, the battery impedance accumulated when the large current is used for charging may be eliminated to a certain extent, that is, the polarization phenomenon due to a fact that the battery is charged by adopting the large current is relieved, so that it is possible to effectively prevent the voltage value corresponding to the current value in the constant current charging stage from reaching the target cutoff voltage value too early, which otherwise will cause the constant voltage charging stage with relatively long charging time to be entered, thereby further shortening the charging time of the battery; on the other hand, since the larger the current value is, the faster the charging speed of the battery is, by sequentially increasing the second current value in each charging cycle, the charging speed may be improved effectively.

For a fourth possible implementation, the first current value in the (M+1)-th charging cycle is a difference between the first current value in the M-th charging cycle and the first preset value, and the second current value in the (M+1)-th charging cycle is a sum of the second current value in the M-th charging cycle and the second preset value. The first preset value is a value greater than or equal to 0 and less than the first current value in the M-th charging cycle, and the second preset value is a value greater than or equal to 0 and less than the second current value in the M-th charging cycle.

Figure 5:
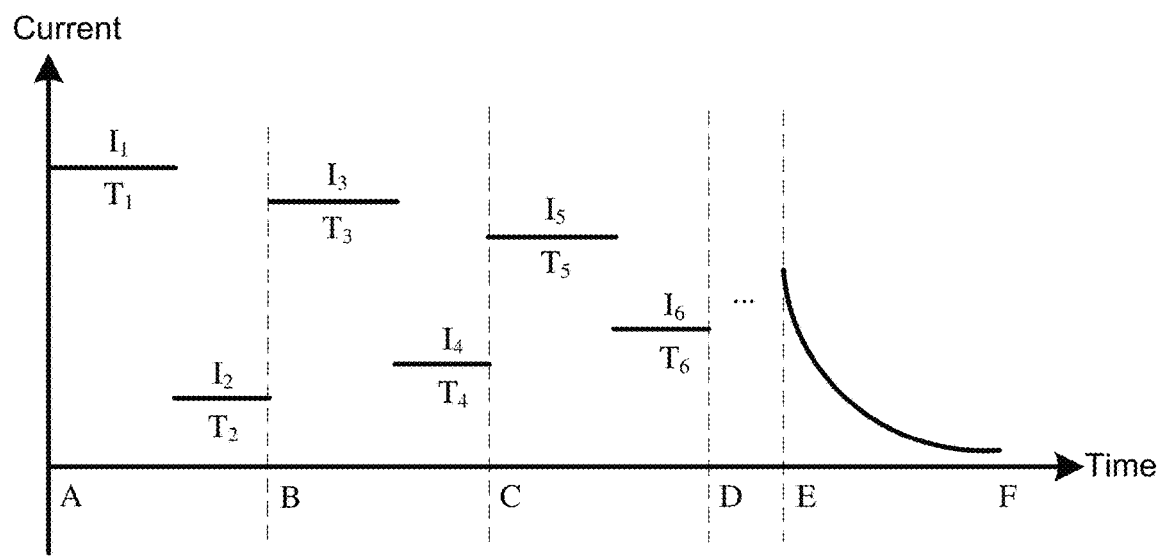
FIG. 5 is a fourth schematic diagram of a current-time curve in a charging process, in accordance with some embodiments of the present disclosure.

For example, FIG. 5 is a schematic diagram of a current-time curve in another charging process, in accordance with some embodiments of the present disclosure. The charging process of the battery may include a constant current charging stage AE and a constant voltage charging stage EF. The constant current charging stage AE may include N charging cycles, and the N charging cycles may include a first charging cycle AB, a second charging cycle BC, a third charging cycle CD, and other (N−3) charging cycles DE. Assuming that a first current value of each of the N charging cycles is $I_{2n-1}$, a second current value of each charging cycle is $I_{2n}$, the first preset value is $\Delta I_1$, and the second preset value is $\Delta I_2$, then, as shown in FIG. 5, a first current value $I_3$ in the second charging cycle BC is a difference between a first current value $I_1$ in the first charging cycle AB and the first preset value $\Delta I_1$, a second current value $I_4$ in the second charging cycle BC is a sum of the second current value $I_2$ in the first charging cycle AB and the second preset value $\Delta I_2$, a first current value $I_5$ in the third charging cycle CD is a difference between the first current value $I_3$ in the second charging cycle BC and the first preset value $\Delta I_1$, a second current value $I_6$ in the third charging cycle CD is a sum of the second current value $I_4$ in the second charging cycle BC and the second preset value $\Delta I_2$, . . . , and so on. Since a charging voltage value corresponding to the first current value will increase with an increase of the charging time, and a charging voltage value corresponding to the second current value will increase with the increase of the charging time, the charging process of the battery may enter the constant voltage charging stage EF in the case where the charging voltage value corresponding to the first current value is greater than or equal to the first cutoff voltage value, or in the case where the charging voltage value corresponding to the second current value is greater than or equal to the second cutoff voltage value.

It can be understood that, a difference from the first possible implementation, the second possible implementation, and the third possible implementation is that, in the fourth possible implementation, the first current value in the (M+1)-th charging cycle is the difference between the first current value in the M-th charging cycle and the first preset value, and the second current value in the (M+1)-th charging cycle is the sum of the second current value in the M-th charging cycle and the second preset value. By reducing the first current value in each charging cycle in sequence, it is possible to effectively relieve the polarization phenomenon due to a fact that the large current is adopted to charge the battery, and to effectively prolong the service life of the battery. Moreover, by increasing the second current value in each charging cycle in sequence, the charging speed may be effectively improved while the polarization phenomenon due to the fact that the large current is adopted to charge the battery is relieved.

Optionally, in some embodiments of the present disclosure, in each of the N charging cycles, a sum of the first current value and the second current value may be T times a maximum constant current charging current value allowed by the battery. T is an integer greater than or equal to 2 and less than or equal to 10.

For example, assuming that the first current value in each of the N charging cycles is $I_{2n-1}$, and the second current value is $I_{2n}$, then the first current value $I_{2n-1}$ and the second current value $I_{2n}$ may correspond to a calculation formula:

$$I_{2n-1} + I_{2n} = T \times I_{allowed}.$$

Where $I_{allowed}$ may be the maximum constant current charging current value allowed by the battery at a certain temperature. In general, a range of $I_{allowed}$ may be [0.2

C×$Q_{nor}$, 0.2 C×$Q_{nor}$], and $Q_{nor}$ may be a rated electric quantity value of the battery, i.e., a rated capacity value of the battery.

It can be understood that, a difference from the related art in which the maximum constant current charging current value allowed by the battery is used to charge the battery in the constant current charging stage is that, in some embodiments of the present disclosure, on the one hand, since the first current value may be greater than the maximum constant current charging current value, the adoption of the first current value to charge the battery may improve the charging speed of the battery; on the other hand, since the second current value may be less than the maximum constant current charging current value, the adoption of the second current value to charge the battery may eliminate the battery impedance accumulated when the first current value is adopted to charge the battery to a certain extent, that is, the polarization phenomenon due to adoption of the large current to charge the battery is relieved. Therefore, it is possible to reduce the battery impedance to be eliminated after the constant voltage charging stage is entered, thereby shortening the charging duration in the constant voltage charging stage, which further shortens the charging time of the battery, and prolongs the service life of the battery.

Optionally, in some embodiments of the present disclosure, in each of the N charging cycles, a duration of charging according to the first current value may be greater than a duration of charging according to the second current value.

Optionally, in some embodiments of the present disclosure, in each of the N charging cycles, the duration of charging according to the first current value may be K times the duration of charging according to the second current value, and K is a value greater than or equal to 1 and less than or equal to 5.

For example, assuming that in each of the N charging cycles, the duration of charging according to the first current value is $T_{2n-1}$, and the duration of charging according to the second current value is $T_{2n}$, then the duration $T_{2n-1}$ of charging according to the first current value and the duration $T_{2n}$ of charging according to the second current value may correspond to a calculation formula:

$$T_{2n-1} = K \times T_{2n}.$$

It can be understood that, in each of the N charging cycles, the duration of charging according to the first current value may be greater than the duration of charging according to the second current value, so that a duration according to the large current may be relatively long in the charging process, which may improve the charging speed of the battery.

Optionally, the battery in some embodiments of the present disclosure may be a battery of a mobile terminal, and may also be a battery of a non-mobile terminal. For example, the battery of the mobile terminal may be a battery in a mobile phone, a tablet computer, a notebook computer, a palmtop computer, a vehicle-mounted terminal, a wearable device, an ultra-mobile personal computer (UMPC), a netbook, or a personal digital assistant (PDA), etc.; The battery of the non-mobile terminal may be a battery in a personal computer (PC), a television (TV), a teller machine, or a self-service machine, etc., which may be determined according to actual use demands, and not limited by the embodiments of the present disclosure.

Optionally, the battery in some embodiments of the present disclosure may be a lithium-ion battery, a lithium metal battery, a lead acid battery, a nickel-chromium battery, a nickel-hydrogen battery, a sodium ion battery, a lithium-sulfur battery, or a lithium air battery, etc., which may be determined according to actual use demands, and not limited by the embodiments of the present disclosure.

In step 102, at the end of the N charging cycle, the charging device determines whether a target voltage value is greater than or equal to the target cutoff voltage value.

The target voltage value may be the charging voltage value corresponding to the first current value. Accordingly, the target cutoff voltage value may be the first cutoff voltage value.

Alternatively, the target voltage value may be the charging voltage value corresponding to the second current value. Accordingly, the target cutoff voltage value may be the second cutoff voltage value. The second cutoff voltage value is less than the first cutoff voltage value.

In some embodiments of the present disclosure, at the end of the N charging cycles, the charging device may determine whether the charging voltage value corresponding to the first current value is greater than or equal to the first cutoff voltage value, and determine whether the charging voltage value corresponding to the second current value is greater than or equal to the second cutoff voltage value. In the case where the charging voltage value corresponding to the first current value is greater than or equal to the first cutoff voltage value, or in the case where the charging voltage value corresponding to the second current value is greater than or equal to the second cutoff voltage value, the charging device may perform the following step 103. Otherwise, the charging device returns to continue to perform the step 101.

Optionally, in some embodiments of the present disclosure, the first cutoff voltage value may be a sum of the second cutoff voltage value and a compensation voltage value.

For example, assuming that the first cutoff voltage value is represented by $V_{cutoff}$, the second cutoff voltage value is represented by $V_{nor}$, and then the first cutoff voltage value $V_{cutoff}$ and the second cutoff voltage value $V_{nor}$ may correspond to a calculation formula:

$$V_{cutoff} = V_{nor} + \Delta V.$$

Where $V_{nor}$ may be a charging cutoff voltage value of a related battery, e.g., $V_{nor}$ equals 4.4 V ($V_{nor}$=4.4 V). $\Delta V$ may be a compensation voltage value of a voltage drop of battery impedance, e.g., $\Delta V$ equals 0.1 V ($\Delta V$=0.1 V).

Optionally, in some embodiments of the present disclosure, in each of the N charging cycles, the charging voltage value corresponding to the first current value may be greater than the charging voltage value corresponding to the second current value.

Optionally, in some embodiments of the present disclosure, in each of the N charging cycles, the charging voltage value corresponding to the first current value may increase with an increase in the charging time, and the charging voltage value corresponding to the second current value may increase with the increase in the charging time.

Optionally, in some embodiments of the present disclosure, in different charging cycles of the N charging cycles, a charging voltage value corresponding to the first current value in the (M+1)-th charging cycle may be greater than a charging voltage value corresponding to the first current value in the M-th charging cycle, and a charging voltage value corresponding to the second current value in the (M+1)-th charging cycle may be greater than a charging voltage value corresponding to the second current value in the M-th charging cycle.

Figure 6:
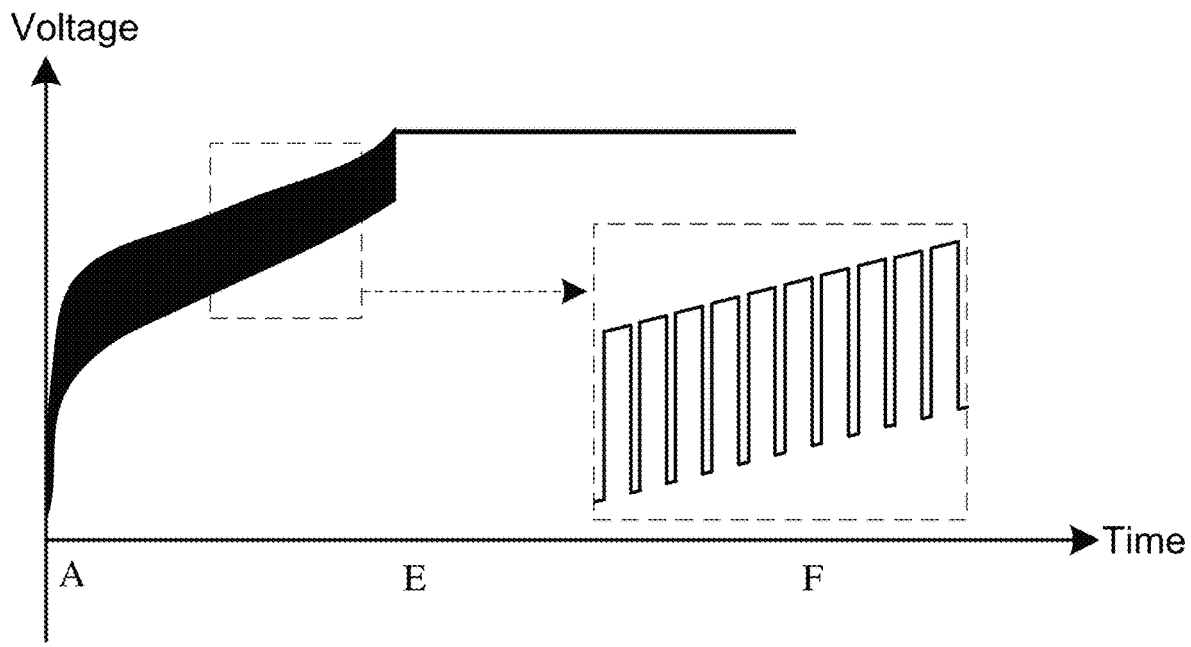
FIG. 6 is a schematic diagram of a voltage-time curve in a charging process, in accordance with some embodiments of the present disclosure.

For example, FIG. 6 is a schematic diagram of a voltage-time curve in a charging process, in accordance with some embodiments of the present disclosure. The charging process of the battery may include a constant current charging stage AE and a constant voltage charging stage EF, and the constant current charging stage AE may include a plurality of charging cycles. In the constant current charging stage AE, as the charging time increases, the charging voltage value corresponding to the first current value in each charging cycle also increases, and the charging voltage value corresponding to the second current value in each charging cycle also increases. The charging voltage value corresponding to the first current value in the (M+1)-th charging cycle may be greater than the charging voltage value corresponding to the first current value in the M-th charging cycle; and the charging voltage value corresponding to the second current value in the (M+1)-th charging cycle may be greater than the charging voltage value corresponding to the second current value in the M-th charging cycle.

In step 103, the charging device charges the battery according to the target cutoff voltage value.

In some embodiments of the present disclosure, in the case where the charging voltage value corresponding to the first current value is greater than or equal to the first cutoff voltage value, the charging device may charge the battery according to the first cutoff voltage value until the charging process ends; or, in the case where the charging voltage value corresponding to the second current value is greater than or equal to the second cutoff voltage value, the charging device may charge the battery according to the second cutoff voltage value until the charging process ends.

For example, still taking FIG. 6 as an example for illustration, in the case where a charging voltage value corresponding to the first current value of the Nth charging cycle in the constant current charging stage is greater than or equal to a first cutoff voltage value, the charging device may end the constant current charging stage AE and enter the constant voltage charging stage EF. Then, the charging device may charge the battery according to the first cutoff voltage value until a condition for stopping the charging is satisfied, and then the charging process ends.

The charging method provided by some embodiments of the present disclosure is different from a method in which a constant current value is adopted to charge the battery in the constant current charging stage in the related art. Since the first current value and the second current value may be adopted to charge the battery of each of the N charging cycles, on the one hand, the adoption of the first current value to charge the battery may improve the charging speed of the battery, and on the other hand, the adoption of the second current value to charge the battery may eliminate the battery impedance accumulated when the first current value is adopted to charge the battery to a certain extent, that is, the polarization phenomenon due to the adoption of the larger current to charge the battery is relieved, so that the battery impedance to be eliminated after the constant voltage charging stage is entered may be reduced. The charging method provided by some embodiments of the present disclosure may shorten the charging duration of the constant voltage charging stage, thereby shortening the charging time of the battery, and prolonging the service life of the battery.

Optionally, in some embodiments of the present disclosure, after the step 103, the charging method provided by some embodiments of the present disclosure may further include the following step 104.

In step 104, in the case where a target charging current value is less than or equal to a target cutoff current value, or a residual electric quantity value of the battery is greater than or equal to a target cutoff electric quantity value, the charging device stops charging the battery.

The target charging current value may be a charging current value corresponding to the target cutoff voltage value.

Optionally, in some embodiments of the present disclosure, the target cutoff electric quantity value may be less than or equal to a rated electric quantity value of the battery, i.e., a rated capacity value of the battery.

Optionally, in some embodiments of the present disclosure, the target cutoff electric quantity value may be represented by $Q_{cutoff}$, and may be obtained by a formula $Q_{cutoff}=Q_{nor} \times b$. Where $Q_{nor}$ may be the rated electric quantity value of the battery, b may be a constant, and b is greater than or equal to 0.99, and is less than or equal to 1 ($0.99 \leq b \leq 1$). It will be understood that, since the target cutoff electric quantity value may be less than the rated electric quantity value of the battery, relative to the rated electric quantity value being used as an electric quantity value of the battery at an end of charging, using the target cutoff electric quantity value as the electric quantity value of the battery at the end of charging may shorten the charging time in the constant voltage charging stage, thereby avoiding corrosion of the battery due to long-time charging, for example, lithium precipitation of a lithium battery may be avoided.

Optionally, in some embodiments of the present disclosure, the target cutoff current value may be represented by $I_{cutoff}$, and may be obtained through a formula $I_{cutoff}=I_{nor} \times a$. Where $I_{nor}$ may be used to represent a charging cutoff current value of the related battery, a is a constant, and a is greater than or equal to 1, and is less than or equal to 5 ($1 \leq a \leq 5$). It can be understood that, since the target cutoff current value is greater than the charging cutoff current value of the related battery, by increasing the charging cutoff current value of the battery, it may be possible to shorten the charging time in the constant voltage charging stage, so that corrosion of the battery due to long-time charging may be avoided, for example, the lithium precipitation of the lithium battery may be avoided.

For example, as shown in any one of FIGS. 2 to 6, in the constant voltage charging stage EF, as the charging time increases, the target charging current value corresponding to the target cutoff voltage value decreases accordingly. Meanwhile, as the charging time increases, the residual electric quantity value of the battery increases accordingly. Thus, if the target charging current value is less than or equal to the target cutoff current value, or the residual electric quantity value of the battery is greater than or equal to the target cutoff electric quantity value, the charging device may stop charging the battery; and if the target charging current value is greater than the target cutoff current value, and the residual electric quantity value of the battery is less than the target cutoff electric quantity value, the charging device may continue to charge the battery according to the target cutoff voltage value.

For the charging method provided by some embodiments of the present disclosure, since in the case where the target charging current value is less than or equal to the target cutoff current value, or the residual electric quantity value of the battery is greater than or equal to the target cutoff electric quantity value, the charging device may stop charging the battery, so that the corrosion of the battery caused by long-time charging may be avoided in the case where the residual electric quantity value of the battery is ensured, for example, the lithium precipitation of the lithium battery may be avoided.

Optionally, in some embodiments of the present disclosure, before the steps 101 to 104, the charging method provided by some embodiments of the present disclosure may further include the following steps 105 and 106.

In step 105, before charging the battery, the charging device detects an initial state of the battery.

The initial state includes at least one of a temperature value of the battery, the residual electric quantity value of the battery, and an impedance value of the battery.

In step 106, the charging device selects a first charging model from a plurality of charging models according to the initial state.

The first charging model may be used to provide charging parameters, and the charging parameters may be parameters for charging the battery according to the charging method provided by the above embodiments.

Optionally, in some embodiments of the present disclosure, a plurality of charging models may be pre-stored in the charging device, and charging parameters for charging the battery corresponding to each charging model may be different.

Optionally, in some embodiments of the present disclosure, the charging parameters for charging the battery may include: a first current value, a second current value, a first cutoff voltage value, a second cutoff voltage value, a target cutoff current value, a target cutoff electric quantity value, a first preset value, a second preset value, and the like, which may be determined according to actual use demands, and not limited by the embodiments of the present disclosure.

In step 107, the charging device performs the charging method of the steps 101 to 104 based on the first charging model.

Before charging the battery, the charging device may detect the initial state of the battery. For example, the initial state may include at least one of the temperature value of the battery, the residual electric quantity value of the battery, and the impedance value of the battery. Moreover, the charging device may select a charging model matching the initial state of the battery from a plurality of charging models stored in advance according to the initial state. That is, the first charging model is selected. Then, the charging device may perform the charging method of the steps 101 to 104 based on the first charging model. For example, after charging the battery according to the first current value, the charging device may charge the battery according to the second current value.

In the charging method provided by some embodiments of the present disclosure, since before the battery is charged, the charging model matching the initial state of the battery may be selected according to the initial state of the battery, and the charging parameters for charging the battery may be provided based on the first charging model to charge the battery, it is possible to make the initial state of the battery adapted to the charging parameters provided by the first charging model, so that a charging efficiency of the battery may be improved, the charging time of the battery may be shortened, and the service life of the battery may be prolonged.

Based on the charging method provided by the embodiments, two implementations are provided below.

For example, the battery in some embodiments of the present disclosure may include: an anode, a cathode, electrolyte, a separator and an aluminum-plastic membrane. The anode may be formed by mixing graphite with a proportion of 97.7%, styrene-butadiene rubber with a proportion of 1.0%, and methyl cellulose with a proportion of 1.3%. The cathode may be formed by mixing lithium cobaltate with a proportion of 97%, polyvinylidene fluoride with a proportion of 1.6%, and spandex with a proportion of 1.4%. The electrolyte may be formed by mixing organic solution, additives and electrolyte salt in certain proportions. The separator may be a polyethylene film.

Implementation 1

In the case where an ambient temperature value of the battery is within a range from 15 degrees centigrade (° C.) to 20° C., assuming that the rated electric quantity value (i.e., the rated capacity value) of the battery is that $Q_{nor}$ equals 3500 milliampere hours (mAh) ($Q_{nor}$=3500 mAh), a charge cutoff rate in the related art is that $I'_{cutoff}$ equals 0.025 coulombs (C) ($I'_{cutoff}$=0.025 C), and a maximum constant current charging rate allowed by the battery in the related art is that ($I'_{allowed}$ equals 0.7 C ($I'_{allowed}$=0.7 C), and then the charging cutoff current value of the battery corresponding to the charge cutoff rate in the related art is that:

$$I_{nor}=I'_{cutoff} \times Q_{nor}=0.025 \text{ C} \times 3500 \text{ mAh}=87.5 \text{ mA (milliampere)}.$$

A maximum constant current charging current value allowed by the battery corresponding to the maximum constant current charging rate allowed by the battery in the related art is that:

$$I_{allowed}=I'_{allowed} \times Q_{nor}=0.7 \text{ C} \times 3500 \text{ mAh}=2450 \text{ mA}.$$

Assuming that a calculation formula between the first current value $I_{2n-1}$ and the second current value $I_{2n}$ in each charging cycle is that $I_{2n-1}+I_{2n}=2 \times I_{allowed}$, assuming that a calculation formula between the duration $T_{2n-1}$ of charging according to the first current value and the duration $T_{2n}$ of charging according to the second current value is that $T_{2n-1}=2 \times T_{2n}$, assuming that the first current value of the first charging cycle is that $I_1$ equals to 3500 mA ($I_1$=3500 mA), and the duration $T_1$ of charging according to the first current value in each charging cycle equals 10 seconds (s) ($T_1$=10 s), then, the second current value of the first charging cycle may be that:

$$I_2=2 \times I_{allowed}-I_1=2450 \text{ mA} \times 2-3500 \text{ mA}=1400 \text{ mA}.$$

The duration of charging according to the second current value in each charging cycle is that $T_2=T_1/2=10 \text{ s}/2=5 \text{ s}$.

Optionally, assuming that the first preset value and the second preset value are both that $\Delta I=0.01 \text{ C} \times Q_{nor}=0.01 \text{ C} \times 3500 \text{ mA}=35 \text{ mA}$, the first current value $I_3$ of the second charging cycle may be that:

$$I_3=I_1-\Delta I=3500 \text{ mA}-35 \text{ mA}=3465 \text{ mA}.$$

The second current value $I_4$ of the second charging cycle may be that:

$$I_4=I_2+\Delta I=1400 \text{ mA}+35 \text{ mA}=1435 \text{ mA}.$$

By analogy, the first current value $I_{2n-1}$ and the second current value $I_{2n}$ of each charging cycle may be obtained.

Assuming that the compensation voltage value of the voltage drop of the battery impedance is that $\Delta V$ equals 0.05 V ($\Delta V$=0.05 V), and the charging cutoff voltage value of the battery in the related art is that $V_{nor}$ equals 4.4 V ($V_{nor}$=4.4 V), that is, the second cutoff voltage value is 4.4 V, and then the first cutoff voltage value of the battery may be that:

$$V_{cutoff}=V_{nor}+\Delta V=4.4 \text{ V}+0.05 \text{ V}=4.45 \text{ V}.$$

Assuming that a calculation formula between the target cutoff current value $I_{cutoff}$ and the charging cutoff current value $I_{nor}$ of the battery in the related art is that: $I_{cutoff}=I_{nor} \times 4$, then the target cutoff current value may be that: $I_{cutoff}=I_{nor} \times 4=87.5 \text{ mA} \times 4=350 \text{ mA}$.

Assuming that the target cutoff electric quantity value may use a calculation formula between $Q_{cutoff}$ and the rated electric quantity value $Q_{nor}$ of the battery, i.e. $Q_{cutoff}=Q_{nor} \times$ 0.99, then the target cutoff current value may be: $Q_{cutoff}=Q_{nor}\times0.99=3500$ mAh×0.99=3465 mA.

The charging device may perform the following charging steps according to data of the Implementation 1.

1) In the first charging cycle, after charging the battery for 10 s according to the first current value $I_1$ of 3500 mA, the charging device may charge the battery for 5 s according to the second current value $I_2$ of 1400 mA.

2) In the second charging cycle, after charging the battery for 10 s according to the first current value $I_3$ of 3465 mA, the charging device may charge the battery for 5 s according to the second current value $I_4$ of 1435 mA.

3) By analogy, in each of the N charging cycles, after charging the battery for 10 s according to the first current value $I_{2n-1}$, the charging device may charge the battery for 5 s according to the second current value $I_{2n}$.

4) In the case where the charging voltage value corresponding to the first current value $I_{2n-1}$ is greater than or equal to the first cutoff voltage value ($V_{cutoff}=4.45$ V), the charging device may charge the battery according to the first cutoff voltage value. Alternatively, in the case where the charging voltage value corresponding to the second current value $I_{2n}$ is greater than or equal to the second cutoff voltage value ($V_{nor}=4.4$ V), the charging device may charge the battery according to the second cutoff voltage value.

5) In the case where the charging current value corresponding to the target cutoff voltage value (i.e., the target charging current value) is less than or equal to the target cutoff current value ($I_{cutoff}=350$ mA), or the residual electric quantity value of the battery is greater than or equal to the target cutoff electric quantity value ($Q_{cutoff}=3465$ mA), the charging device stops charging the battery.

Figure 7:
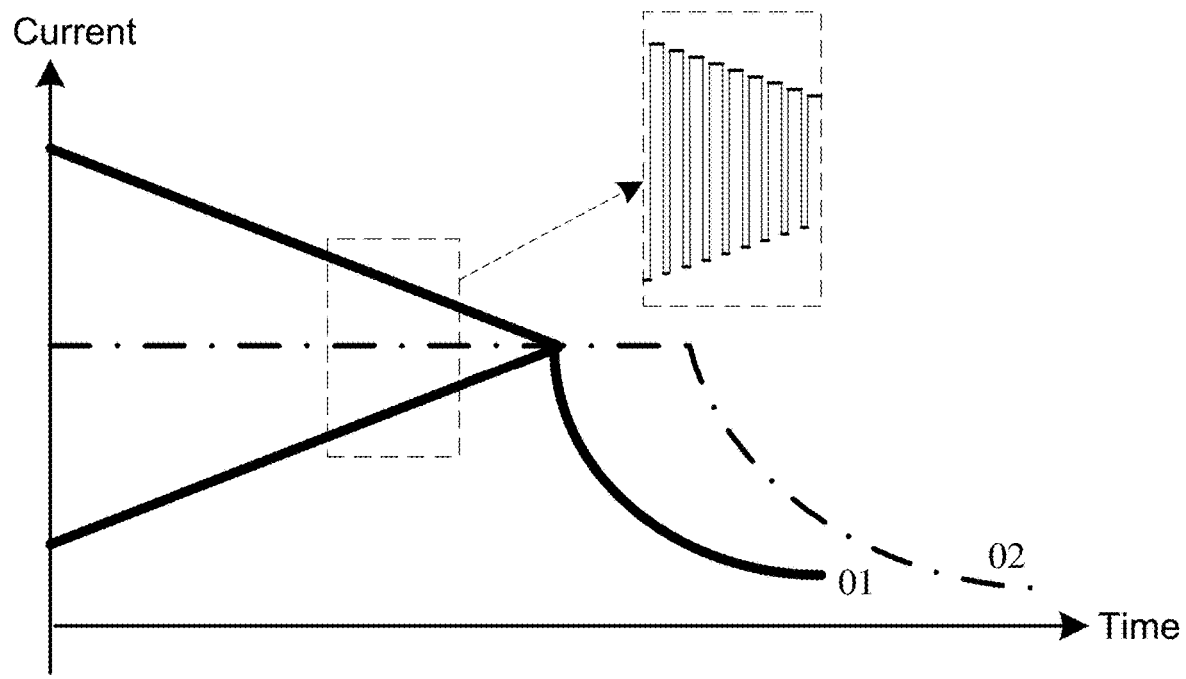
FIG. 7 is a comparative schematic diagram of current-time curves in two charging processes, in accordance with some embodiments of the present disclosure.

For example, FIG. 7 is a comparative schematic diagram of current-time curves of the charging method provided by some embodiments of the present disclosure and a related charging method. The current-time curve corresponding to the charging method provided by some embodiments of the present disclosure may be represented by 01, and the current-time curve of the related charging method may be represented by 02. Since the charging time of the charging method in the related art is longer than the charging time of the charging method provided by some embodiments of the present disclosure, the charging method provided by some embodiments of the present disclosure may shorten the charging time of the battery, and may prolong the service life of the battery.

Implementation 2

In some embodiments of the present disclosure, a charging process of the battery by the charging device may include: a first step of constant current charging stage, a second step of constant current charging stage, and a constant voltage charging stage following the second step of constant current charging stage.

In the case where the ambient temperature value of the battery is within a range from 10° C. to 15° C., assuming that the rated electric quantity value (i.e., the rated capacity value) of the battery is that $Q_{nor}$ equals 3800 mAh ($Q_{nor}=3800$ mAh), the charge cutoff rate in the related art is that $I'_{cutoff}$ equals 0.05 C ($I'_{cutoff}=0.05$ C), a maximum constant current charging rate allowed by the battery in the first step of constant current charging stage is that $I'_{allowed1}$ equals 0.7 C ($I'_{allowed1}=0.7$ C), a maximum constant current charging rate allowed by the battery in the second step of constant current charging stage is that $I'_{allowed2}$ equals 0.5 C ($I'_{allowed2}=0.5$ C), a first current value of the first charging cycle in the first step of constant current charging stage is that $I_1$ equals a product of 1 C and 3800 mAh, i.e., 3800 mA ($I_1=1$ C×3800 mAh=3800 mA), a duration $T_1$ of charging according to the first current value in each charging cycle equals 10 s (t1=10 s), both the first preset value and the second preset value are that $\Delta I$ equals 0 A ($\Delta I=0$ A), a third current value is 1900 mA, the first cutoff voltage value $V_{outoff1}$ equals 4.22 V ($V_{outoff1}=4.22$ V), the second cutoff voltage value $V_{nor1}$ equals 4.2 V ($V_{nor1}=4.2$ V), a compensation voltage value of a voltage drop of battery impedance is that $\Delta V$ equals 0.02 V ($\Delta V=0.02$ V), and the charging cutoff voltage value of the battery in the related art is that $V_{nor}$ equals 4.38 V ($V_{nor}=4.38$ V), the following values may be obtained through calculation with reference to the calculation formulas and the calculation methods in the Implementation 1:

The first current value in each charging cycle is that $I_{2n-1}$ equals 3800 mA ($I_{2n-1}=3800$ mA).

The second current value in each charging cycle is that $I_{2n}$ equals 1520 mA ($I_{2n}=1520$ mA).

The duration of charging according to the first current value in each charging cycle is that $T_1$ equals 10 s ($T_1=10$ s).

The duration of charging according to the second current value in each charging cycle is that $T_2$ equals 5 s ($T_2=5$ s).

A third cutoff voltage value is that $V_{cutoff}$ equals 4.4 V ($V_{cutoff}=4.4$ V).

The target cutoff current value of the battery is that $I_{cutoff}$ equals 760 mA ($I_{cutoff}=760$ mA).

The target cutoff electric quantity value of the battery is that $Q_{cutoff}$ equals 3420 mA ($Q_{cutoff}=3420$ mA).

The charging device may perform the following charging steps according to the above data of the Implementation 2.

1) In the first charging cycle of the first step of constant current charging stage, after charging the battery for 10 s according to the first current value $I_1$ of 3800 mA, the charging device may charge the battery for 5 s according to the second current value $I_2$ of 1520 mA.

2) In the second charging cycle of the first step of constant current charging stage, after charging the battery for 10 s according to the first current value $I_3$ of 3800 mA, the charging device may charge the battery for 5 s according to the second current value $I_4$ of 1520 mA.

3) By analogy, in each charging cycle of the first step of constant current charging stage, after charging the battery for 10 s according to the first current value $I_{2n-1}$, the charging device may charge the battery for 5 s according to the second current value $I_{2n}$.

4) In the case where the charging voltage value corresponding to the first current value $I_{2n-1}$ is greater than or equal to the first cutoff voltage value ($V_{outoff1}=4.22$ V), or in the case where the charging voltage value corresponding to the second current value $I_{2n}$ is greater than or equal to the second cutoff voltage value ($V_{nor1}=4.2$ V), the charging device may enter the second step of constant current charging stage and charge the battery according to the third current value of 1900 mA.

5) In the case where a voltage value corresponding to the third current value is greater than or equal to the third cutoff voltage value ($V_{cutoff2}=4.4$ V), the charging device may enter the constant voltage charging stage, and may charge the battery according to the third cutoff voltage value.

6) In the case where a charging current value corresponding to the third cutoff voltage value (i.e., the target charging current value) is less than or equal to the target cutoff current value ($I'_{cutoff}=760$ mA), or the residual electric quantity value of the battery is greater than or equal to the target cutoff electric quantity value ($Q_{cutoff}=3420$ mA), the charging device may stop charging the battery.

Figure 8:
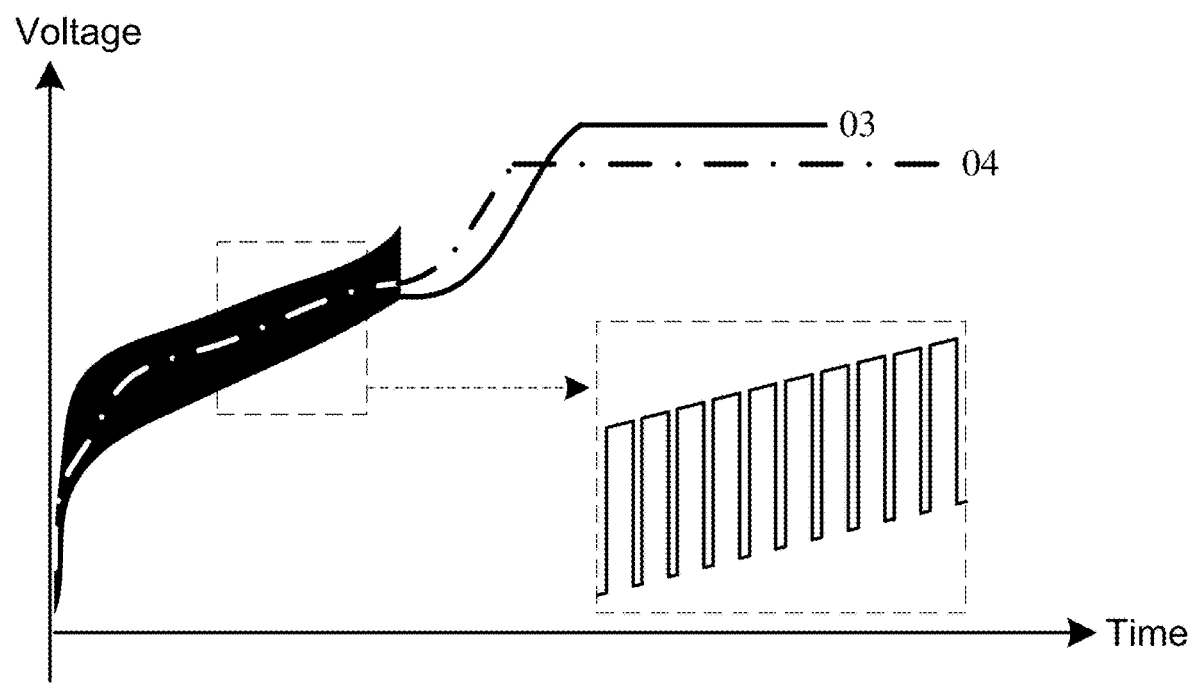
FIG. 8 is a comparative schematic diagram of voltage-time curves in two charging processes, in accordance with some embodiments of the present disclosure.

For example, FIG. 8 is a comparative schematic diagram of voltage-time curves of the charging method provided by some embodiments of the present disclosure and the charging method in the related art. The voltage-time curve corresponding to the charging method provided by some embodiments of the present disclosure may be represented by 03, and the voltage-time curve of the charging method in the related art may be represented by 04. Since the charging time of the charging method in the related art is longer than the charging time of the charging method provided by some embodiments of the present disclosure, the charging method provided by some embodiments of the present disclosure may shorten the charging time of the battery, and may prolong the service life of the battery.

Figure 9:
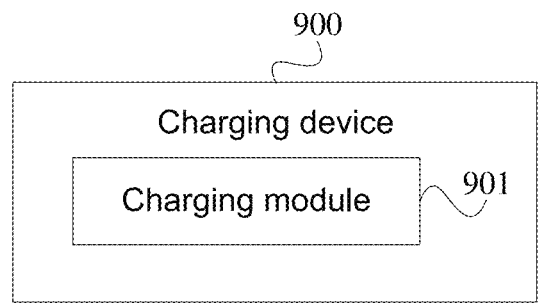
FIG. 9 is a first schematic structural diagram of a charging device, in accordance with some embodiments of the present disclosure.

As shown in FIG. 9, some embodiments of the present disclosure provide a charging device 900. The charging device 900 may include a charging module 901. The charging module 901 may be used to charge a battery according to a second current value after charging the battery according to a first current value in each of N charging cycles, the second current value being less than the first current value, and N being a positive integer; and to, at the end of the N charging cycle, charge the battery according to a target cutoff voltage value in the case where a target voltage value is greater than or equal to the target cutoff voltage value. The target voltage value is a charging voltage value corresponding to the first current value, and the target cutoff voltage value is a first cutoff voltage value; or, the target voltage value is a charging voltage value corresponding to the second current value, the target cutoff voltage value is a second cutoff voltage value, the second cutoff voltage value is less than the first cutoff voltage value, and N is a positive integer.

Optionally, in some embodiments of the present disclosure, the charging module 901 may further be used to stop charging the battery after charging the battery according to the target cutoff voltage value in the case where the target charging current value is less than or equal to the target cutoff current value, or a residual electric quantity value of the battery is greater than or equal to a target cutoff electric quantity value. The target charging current value may be the charging current value corresponding to the target cutoff voltage value.

Optionally, in some embodiments of the present disclosure, a first current value in an (M+1)-th charging cycle of the N charging cycles may be a difference between a first current value in an M-th charging cycle and a first preset value, and a second current value in the (M+1)-th charging cycle of the N charging cycles may be a sum of a second current value in the M-th charging cycle and a second preset value. The first preset value may be a value greater than or equal to 0 and less than the first current value in the M-th charging cycle, the second preset value may be a value greater than or equal to 0 and less than the second current value in the M-th charging cycle, and M is a positive integer.

Optionally, in some embodiments of the present disclosure, in each charging cycle, a sum of the first current value and the second current value may be T times a maximum constant current charging current value allowed by the battery, and T is an integer greater than or equal to 2 and less than or equal to 10.

Optionally, in some embodiments of the present disclosure, in each charging cycle, a duration of charging according to the first current value may be greater than a duration of charging according to the second current value.

Optionally, in some embodiments of the present disclosure, in each charging cycle, the duration of charging according to the first current value may be K times the duration of charging according to the second current value. K is a value greater than or equal to 1 and less than or equal to 5.

Figure 10:
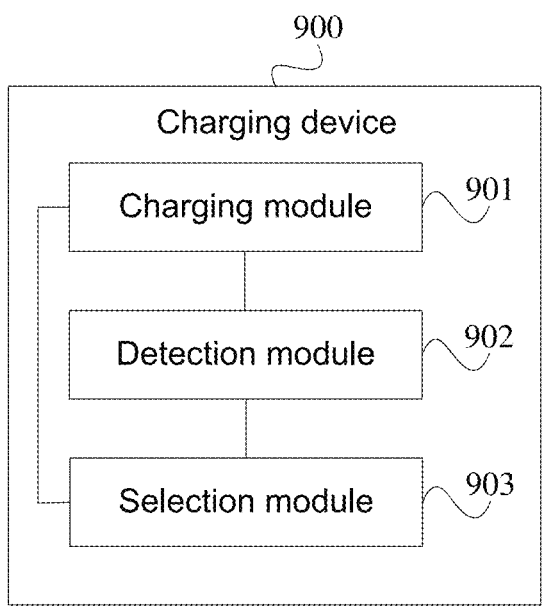
FIG. 10 is a second schematic structural diagram of a charging device, in accordance with some embodiments of the present disclosure.

Optionally, with reference to FIG. 9 and as shown in FIG. 10, the charging device provided by some embodiments of the present disclosure may further include a detection module 902 and a selection module 903. The detection module 902 may be used to detect an initial state of the battery, and the initial state includes at least one of a temperature value of the battery, the residual electric quantity value of the battery, and an impedance value of the battery. The selection module 903 may be used to select a first charging model from a plurality of charging models according to the initial state detected by the detection module 902. The first charging model is used to provide charging parameters, and the charging parameters are parameters for charging the battery.

The charging device provided by some embodiments of the present disclosure can implement processes implemented by the charging device in the above method embodiments, which will not be described here again to avoid repetition.

For the charging device provided by some embodiments of the present disclosure, since in each of the N charging cycles, the charging device may adopt the first current value and the second current value to charge the battery, the charging speed of the battery may be improved by the charging device adopting the first current value to charge the battery, and the battery impedance accumulated when the first current value is adopted to charge the battery may be eliminated to a certain extent by the charging device adopting the second current value to charge the battery, that is, a polarization phenomenon due to adoption of large current to charge the battery may be relieved, so that the battery impedance to be eliminated after a constant voltage charging stage is entered may be reduced. The charging device provided by some embodiments of the present disclosure may shorten a charging duration in the constant voltage charging stage, thereby shortening the charging time of the battery and prolonging a service life of the battery.

Figure 11:
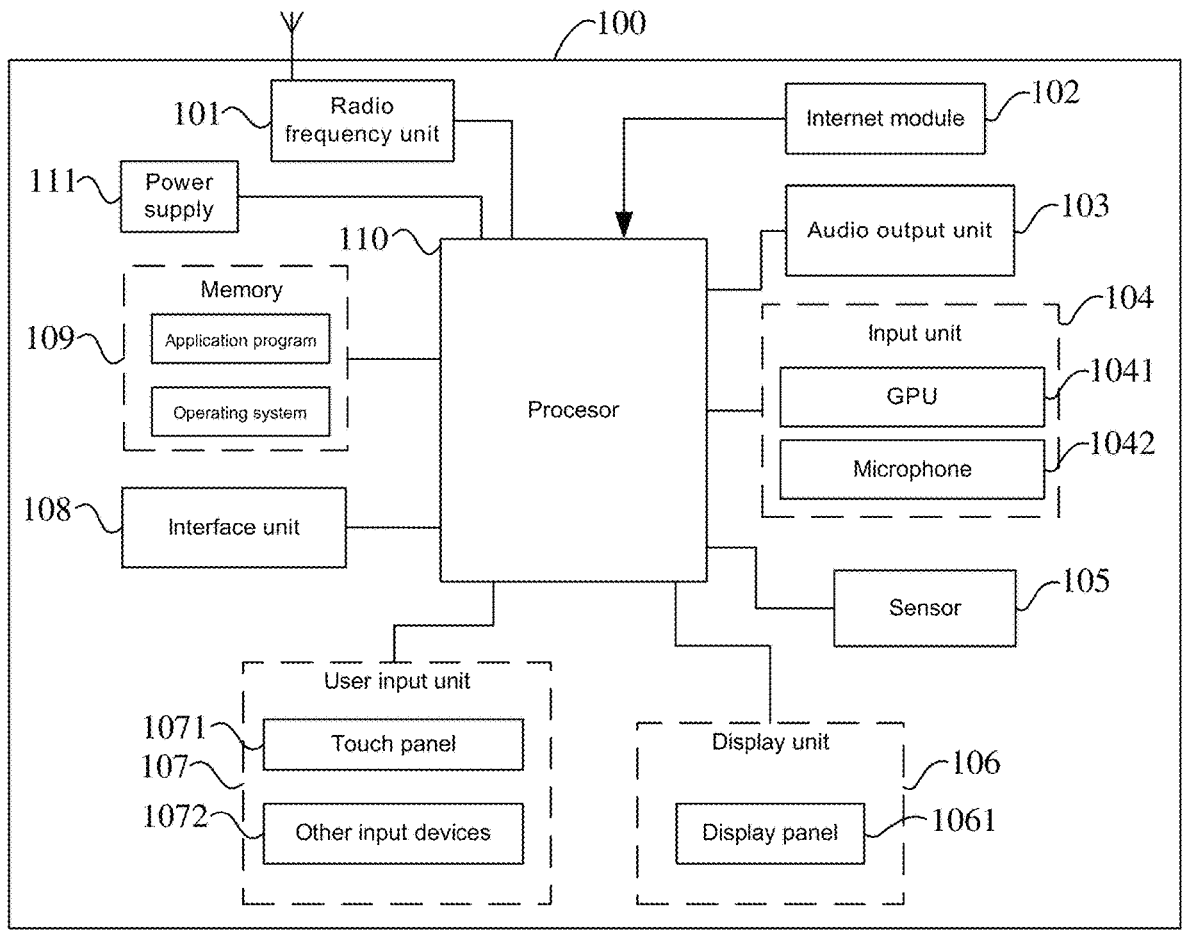
FIG. 11 is a schematic diagram of hardware of a charging device, in accordance with some embodiments of the present disclosure.

FIG. 11 is a schematic diagram showing a structure of hardware of a terminal device implementing the embodiments of the present disclosure. As shown in FIG. 11, a terminal device 100 may include, but be not limited to, a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the terminal device shown in FIG. 11 does not constitute a limitation on the terminal device, and the terminal device may include more or fewer components than the terminal device shown in the figure, or combine certain components, or have a different arrangement of components. In some embodiments of the present disclosure, the terminal devices include, but are not limited to, a mobile phone, a tablet computer, a notebook computer, a palmtop computer, a vehicle-mounted terminal device, a wearable device, and a pedometer.

The processor 110 is configured to charge the power supply 111 according to a second current value after charging the power supply 111 according to a first current value in each of N charging cycles, the second current value being less than the first current value, and N being a positive integer; and to charge the power supply 111 according to a target cutoff voltage value in the case where a target voltage value is greater than or equal to the target cutoff voltage value at the end of the N charging cycle. The target voltage value is a charging voltage value corresponding to the first current value, and the target cutoff voltage value is a first cutoff voltage value; or, the target voltage value is a charging voltage value corresponding to the second current value, the target cutoff voltage value is a second cutoff voltage value, and the second cutoff voltage value is less than the first cutoff voltage value.

In some embodiments of the present disclosure, the processor 110 may further be configured to stop charging the battery after charging the battery according to the target cutoff voltage value in the case where the target charging current value is less than or equal to the target cutoff current value, or a residual electric quantity value of the battery is greater than or equal to a target cutoff electric quantity value. The target charging current value may be the charging current value corresponding to the target cutoff voltage value.

In some embodiments of the present disclosure, a first current value in an (M+1)-th charging cycle of the N charging cycles may be a difference between a first current value in an M-th charging cycle and a first preset value, and a second current value in the (M+1)-th charging cycle of the N charging cycles may be a sum of a second current value in the M-th charging cycle and a second preset value. The first preset value may be a value greater than or equal to 0 and less than the first current value in the M-th charging cycle, the second preset value may be a value greater than or equal to 0 and less than the second current value in the M-th charging cycle, and M is a positive integer.

In some embodiments of the present disclosure, in each charging cycle, a sum of the first current value and the second current value may be T times a maximum constant current charging current value allowed by the battery, and T is an integer greater than or equal to 2 and less than or equal to 10.

In some embodiments of the present disclosure, in each charging cycle, a duration of charging according to the first current value may be greater than a duration of charging according to the second current value.

In some embodiments of the present disclosure, in each charging cycle, the duration of charging according to the first current value may be K times the duration of charging according to the second current value. K is a value greater than or equal to 1 and less than or equal to 5.

In some embodiments of the present disclosure, the processor 110 may further be configured to detect an initial state of the battery, and select a first charging model from a plurality of charging models according to the initial state detected, the initial state includes at least one of a temperature value of the battery, the residual electric quantity value of the battery, and an impedance value of the battery. The first charging model is used to provide charging parameters, and the charging parameters are parameters for charging the battery.

It will be noted that, the processor 110 may be the charging device in the above embodiments, and the power supply 111 may be the battery in the above embodiments. That is, the charging device may be a functional module in the terminal device, or the charging device may also be the terminal device, and the power supply 111 may be a functional module in the charging device.

In addition, the above embodiments are described illustratively by taking an example in which the processor 110 may directly manage the power supply 111. It will be understood that, in practical implementation, the power supply 111 may be logically connected to the processor 110 through a power management system. That is, the processor 110 may not need to manage the power supply 211 directly, and it is the power management system that manages the power supply 211, which may be determined according to actual use demands, and not limited by the embodiments of the present disclosure.

For the terminal device provided by some embodiments of the present disclosure, since the terminal device may adopt the first current value and the second current value to charge the battery in each of the N charging cycles, the charging speed of the battery may be improved by the terminal device adopting the first current value to charge the battery, and the battery impedance accumulated when the first current value is adopted to charge the battery may be eliminated to a certain extent by the terminal device adopting the second current value to charge the battery, that is, the polarization phenomenon due to adoption of the large current to charge the battery may be relieved, so that the battery impedance to be eliminated after a constant voltage charging stage is entered may be reduced. The terminal device provided by some embodiments of the present disclosure may shorten the charging duration in the constant voltage charging stage, thereby shortening the charging time of the battery of the terminal device, and prolonging the service life of the battery of the terminal device.

It will be understood that, in some embodiments of the present disclosure, the radio frequency unit 101 may be used to receive messages, or receive and send signals during a conversation. The radio frequency unit 101 may receive downlink data from a base station, and then send the downlink data to the processor 110 for processing; and send uplink data to the base station. Generally, the radio frequency unit 101 includes, but is not limited to, an antenna, at least one amplifier, a transceiver, a coupler, a low-noise amplifier, and a duplexer. In addition, the radio frequency unit 101 may also communicate with a network and other devices through a wireless communication system.

The terminal device provides wireless broadband Internet access for users through the network module 102, such as helping the users to send and receive emails, browse web pages, and access streaming media.

The audio output unit 103 may convert audio data received by the radio frequency unit 101 or the network module 102 or stored in the memory 109 into audio signals, and output the audio signals as sound. Moreover, the audio output unit 103 may further provide audio output related to a specific function performed by the terminal device 100 (e.g., a call signal receiving sound, a message receiving sound, etc.). The audio output unit 103 includes a speaker, a beeper, and a receiver.

The input unit 104 is used to receive audio or video signals. The input unit 104 may include a graphics processing unit (GPU) 1041 and a microphone 1042. The GPU 1041 processes image data of static pictures or videos obtained by an image capture device (e.g., a camera) in a video capture mode or an image capture mode. Processed image frames may be displayed on the display unit 106. The image frames processed via the GPU 1041 may be stored in the memory 109 (or other storage media), or sent via the radio frequency unit 101 or the network module 102. The microphone 1042 may receive sound, and can process the sound into audio data. The processed audio data may be converted into a format that may be sent to a mobile communication base station via the radio frequency unit 101 and output in case of a telephone call mode.

The terminal device 100 further includes at least one type of sensor 105, such as a light sensor, a motion sensor and other sensors. The light sensor includes an ambient light sensor and a proximity sensor. The ambient light sensor may adjust brightness of a display panel 1061 according to brightness of the ambient light. The proximity sensor may turn off the display panel 1061 and/or backlight when the terminal device 100 is moved to an ear. As a type of motion sensors, an accelerometer sensor may detect a magnitude of acceleration in all directions (generally, three axes), and may detect a magnitude and a direction of gravity when the accelerometer sensor is stationary, and may be used to identify a gesture of the terminal device (e.g., horizontal-vertical screen switching, related games, and magnetometer gesture calibration), related functions of vibration recognition (e.g., pedometer and tapping), etc. The sensor 105 may further include a fingerprint sensor, a pressure sensor, an iris sensor, a molecular sensor, a gyroscope, a barometer, a hygrometer, a thermometer and an infrared sensor, which will not be described in detail herein.

The display unit 106 is used to display information input by the users or information provided to the users. The display unit 106 may include the display panel 1061, and the display panel 1061 may be configured in a form of a liquid crystal display (LCD), an organic light-emitting diode (OLED), or the like.

The user input unit 107 may be used to receive an input numeral or character information and generate a key signal input related to user setting and function control of the terminal device. The user input unit 107 includes a touch panel 1071 and other input devices 1072. The touch panel 1071, also known as a touch screen, may collect the user touch operations on or near the touch panel 1071 (e.g., the user operations on or near the touch panel 1071 by using any suitable object or accessory such as a finger and a touch pen). The touch panel 1071 may include two parts, i.e., a touch detection device and a touch controller. The touch detection device detects a user touch position, detects a signal brought by a touch operation, and transmits the signal to the touch controller; and the touch controller receives touch information from the touch detection device, converts the touch information into coordinates of a touch point, sends the coordinates of the touch point to the processor 110, and receives a command sent by the processor 110 and performs the command. In addition, the touch panel 1071 may be implemented by using various types of touch panels, such as a resistive touch panel, a capacitive touch panel, an infrared touch panel, or a surface acoustic wave touch panel. In addition to the touch panel 1071, the user input unit 107 may further include the other input devices 1072. The other input devices 1072 may include, but be not limited to, a physical keyboard, function keys (e.g., volume control keys, and a switch key), a trackball, a mouse and an operating lever, which will not be described in detail herein.

The touch panel 1071 may cover the display panel 1061. After the touch panel 1071 detects a touch operation on or near it, the touch panel 1071 transmits the touch operation to the processor 110 to determine a type of a touch event, and then the processor 110 provides a corresponding visual output on the display panel 1061 according to the type of the touch event. Although in FIG. 11, the touch panel 1071 and the display panel 1061 are used as two separate components to implement input and output functions of the terminal device, in some embodiments, the touch panel 1071 and the display panel 1061 may be integrated to realize the input and output functions of the terminal device, which is not limited herein.

The interface unit 108 is an interface connecting an external device and the terminal device 100. For example, the external device may include a wired or wireless headset port, an external power supply (or battery charger) port, a wired or wireless data port, a memory card port, a port for connecting a device having an identification module, an audio input/output (I/O) port, a video I/O port, and an earphone port. The interface unit 108 may be used to receive an input from the external device (e.g., data information or power) and transmit the received input to one or more elements in the terminal device 100, or may be used to transmit data between the terminal device 100 and the external device.

The memory 109 may be used to store software programs and various data. The memory 109 may mainly include a program storage region and a data storage region. The program storage region may store an operating system and at least one application program required by functions (e.g., a sound playing function and an image playing function). The data storage region may store data created according to use of a mobile phone (e.g., audio data and a phone book). In addition, the memory 109 may include a high-speed random access memory, and may further include a non-volatile memory, such as at least one magnetic disk storage device, a flash memory device, or other volatile solid-state storage devices.

The processor 110 is a control center of the terminal device, connects parts of the entire terminal device through various interfaces and lines, and performs various functions of the terminal device and processes data by running or executing software programs and/or modules stored in the memory 109 and invoking data stored in the memory 109, thereby performing overall monitoring to the terminal device. The processor 110 may include one or more processing units. Optionally, an application processor and a modem processor may be integrated in the processor 110. The application processor mainly deals with the operating system, user interfaces and application programs, and the modem processor mainly deals with wireless communication. It will be understood that, the modem processor may not be integrated into the processor 110.

In addition, the terminal device 100 includes some functional modules that are not shown, which will not be described in details herein.

Embodiments of the present disclosure further provide a charging device that includes a processor, a memory, and a computer program that is stored in the memory and may be executed on the processor. The computer program, when executed by the processor, implements processes in the method embodiments described above, which may achieve same technical effects. To avoid repetition, details will not be described again.

Embodiments of the present disclosure further provide a non-transient computer-readable storage medium. The non-transient computer-readable storage medium stores a computer program that, when executed by a processor, implements processes of the method embodiments described above, which may achieve same technical effects. In order to avoid repetition, details will not be described again. The non-transient computer-readable storage medium may be, for example, a read-only memory (ROM), a random access memory (RAM), a magnetic disk or an optical disk.

It will be noted that, in the present disclosure, the term such as "comprise" or any other variants thereof is intended to cover a non-exclusive inclusion, so that a process, a method, an article or a device that includes a series of elements not only includes those elements, but also includes other elements not explicitly listed, or includes elements inherent to the process, the method, the article or the device. In the case where there is no more limitation, an element defined by the phrase "comprising a . . . " does not exclude existence of other identical elements in a process, a method, an article or a device that includes the element.

Through the description of the above embodiments, a person skilled in the art will clearly understand that the method in the above embodiments may be implemented by using software plus a necessary general-purpose hardware platform, and of course, may also be implemented by hardware, but in many cases, the former is a better implementation manner. On a basis of such understanding, the technical solution of the present disclosure or part(s) contributing to the related art may be embodied in a form of a software product. The computer software product is stored in a storage medium (e.g., a ROM/RAM, a magnetic disk or an optical disk), and includes several instructions for causing a charging device (which may be a mobile phone, a computer, a server, an air conditioner or a network device) to perform the methods described in the embodiments of the present disclosure.

The embodiments of the present disclosure are described above with reference to the accompany drawings, but the present disclosure is not limited to the above specific implementation manners. The above specific implementation manners are illustrative only rather than restrictive. Many forms may be made by a person of ordinary skill in the art under the enlightenment of the present disclosure without departing from the purpose of the present disclosure and the protection scope of the claims, which shall all be included in the protection scope of the present disclosure.

What is claimed is:

1. A charging method, comprising:
   in each of N charging cycles, after charging a battery according to a first current value, charging the battery according to a second current value, wherein the second current value is less than the first current value, and N is a positive integer; and
   at an end of the N charging cycle, charging the battery according to a target cutoff voltage value in the case where a target voltage value is greater than or equal to the target cutoff voltage value;
   wherein the target voltage value is a charging voltage value corresponding to the first current value, and the target cutoff voltage value is a first cutoff voltage value, or the target voltage value is a charging voltage value corresponding to the second current value, and the target cutoff voltage value is a second cutoff voltage value; and
   wherein the second current value in an (M+1)-th charging cycle of the N charging cycles is a sum of the second current value in an M-th charging cycle and a first preset value, and M is a positive integer.

2. The charging method according to claim 1, after charging the battery according to the target cutoff voltage value, the charging method further comprises:
   stopping charging the battery in the case where a target charging current value is less than or equal to a target cutoff current value, or a residual electric quantity value of the battery is greater than or equal to a target cutoff electric quantity value, wherein the target charging current value is a charging current value corresponding to the target cutoff voltage value.

3. The charging method according to claim 1, wherein a first current value in the (M+1)-th charging cycle of the N charging cycles is a difference between a first current value in the M-th charging cycle and a second preset value, the second preset value is a value greater than or equal to 0 and less than the first current value in the M-th charging cycle, and the first preset value is a value greater than or equal to 0 and less than the second current value in the M-th charging cycle.

4. The charging method according to claim 3, wherein in each charging cycle, a sum of the first current value and the second current value is T times a maximum constant current charging current value allowed by the battery, and T is an integer greater than or equal to 2 and less than or equal to 10.

5. The charging method according to claim 3, wherein in each charging cycle, a duration of charging according to the first current value is longer than a duration of charging according to the second current value.

6. The charging method according to claim 5, wherein in each charging cycle, the duration of charging according to the first current value is K times the duration of charging according to the second current value, and K is a value greater than or equal to 1 and less than or equal to 5.

7. The charging method according to claim 1, the charging method further comprises:
   detecting an initial state of the battery, before charging the battery; and
   selecting a first charging model from a plurality of charging models according to the initial state, wherein the first charging model is used to provide charging parameters, and the charging parameters are parameters for charging the battery.

8. A charging device, comprising a processor;
   the processor being configured to: charge a battery according to a second current value after charging the battery according to a first current value in each of N charging cycles, wherein the second current value is less than the first current value, and N is a positive integer; and charge the battery according to a target cutoff voltage value in the case where a target voltage value is greater than or equal to the target cutoff voltage value at an end of the N charging cycle;
   wherein the target voltage value is a charging voltage value corresponding to the first current value, and the target cutoff voltage value is a first cutoff voltage value, or the target voltage value is a charging voltage value corresponding to the second current value, and the target cutoff voltage value is a second cutoff voltage value;
   wherein the second current value in an (M+1)-th charging cycle of the N charging cycles is a sum of the second current value in an M-th charging cycle and a first preset value, and M is a positive integer.

9. The charging device according to claim 8, wherein the processor is further configured to stop charging the battery after charging the battery according to the target cutoff voltage value in the case where a target charging current value is less than or equal to a target cutoff current value, or a residual electric quantity value of the battery is greater than or equal to a target cutoff electric quantity value, and the target charging current value is a charging current value corresponding to the target cutoff voltage value.

10. The charging device according to claim 8, wherein a first current value in the (M+1)-th charging cycle of the N charging cycles is a difference between a first current value in the M-th charging cycle and a second preset value, the second preset value is a value greater than or equal to 0 and less than the first current value in the M-th charging cycle, and the first preset value is a value greater than or equal to 0 and less than the second current value in the M-th charging cycle.

11. The charging device according to claim 10, wherein in each charging cycle, a sum of the first current value and the second current value is T times a maximum constant current charging current value allowed by the battery, and T is an integer greater than or equal to 2 and less than or equal to 10.

12. The charging device according to claim 10, wherein in each charging cycle, a duration of charging according to the first current value is longer than a duration of charging according to the second current value.

13. The charging device according to claim 12, wherein in each charging cycle, the duration of charging according to the first current value is K times the duration of charging according to the second current value, and K is a value greater than or equal to 1 and less than or equal to 5.

14. The charging device according to claim 8, wherein the processor is further configured to detect an initial state of the battery, and select a first charging model from a plurality of charging models according to the initial state detected, the first charging model is used to provide charging parameters, and the charging parameters are parameters for charging the battery.

15. A non-transient computer-readable storage medium, wherein the non-transient computer-readable storage medium stores a computer program that, when executed by a processor, implements steps in the charging method according to claim 1.

* * * * *